June 9, 1964 F. J. LUKETA 3,136,085
SUSPENSION FOR TRAWL NET PANELS AND CHAFING GEAR
Filed March 12, 1962 4 Sheets-Sheet 1
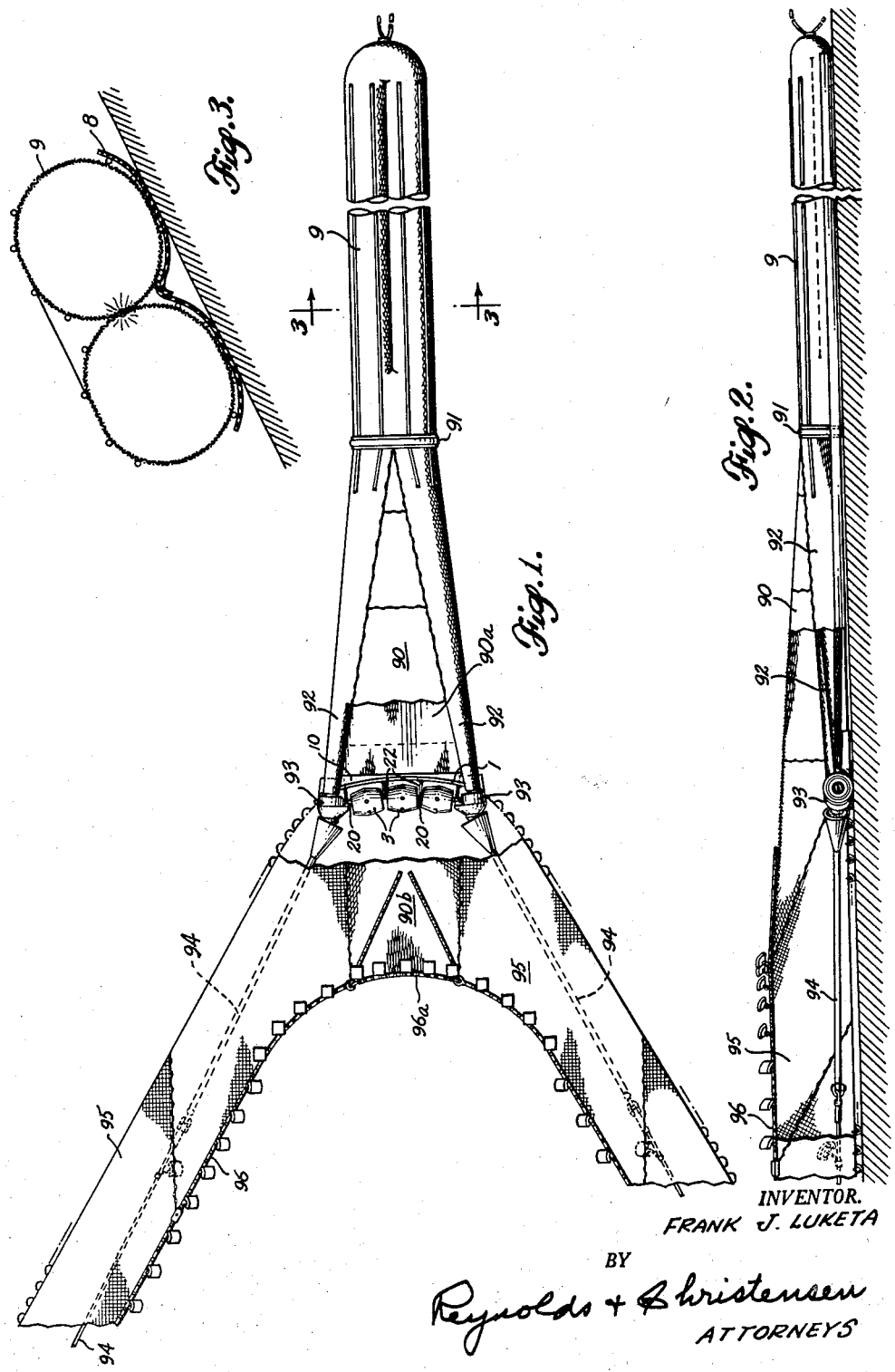
INVENTOR.
FRANK J. LUKETA
BY
Reynolds + Christensen
ATTORNEYS

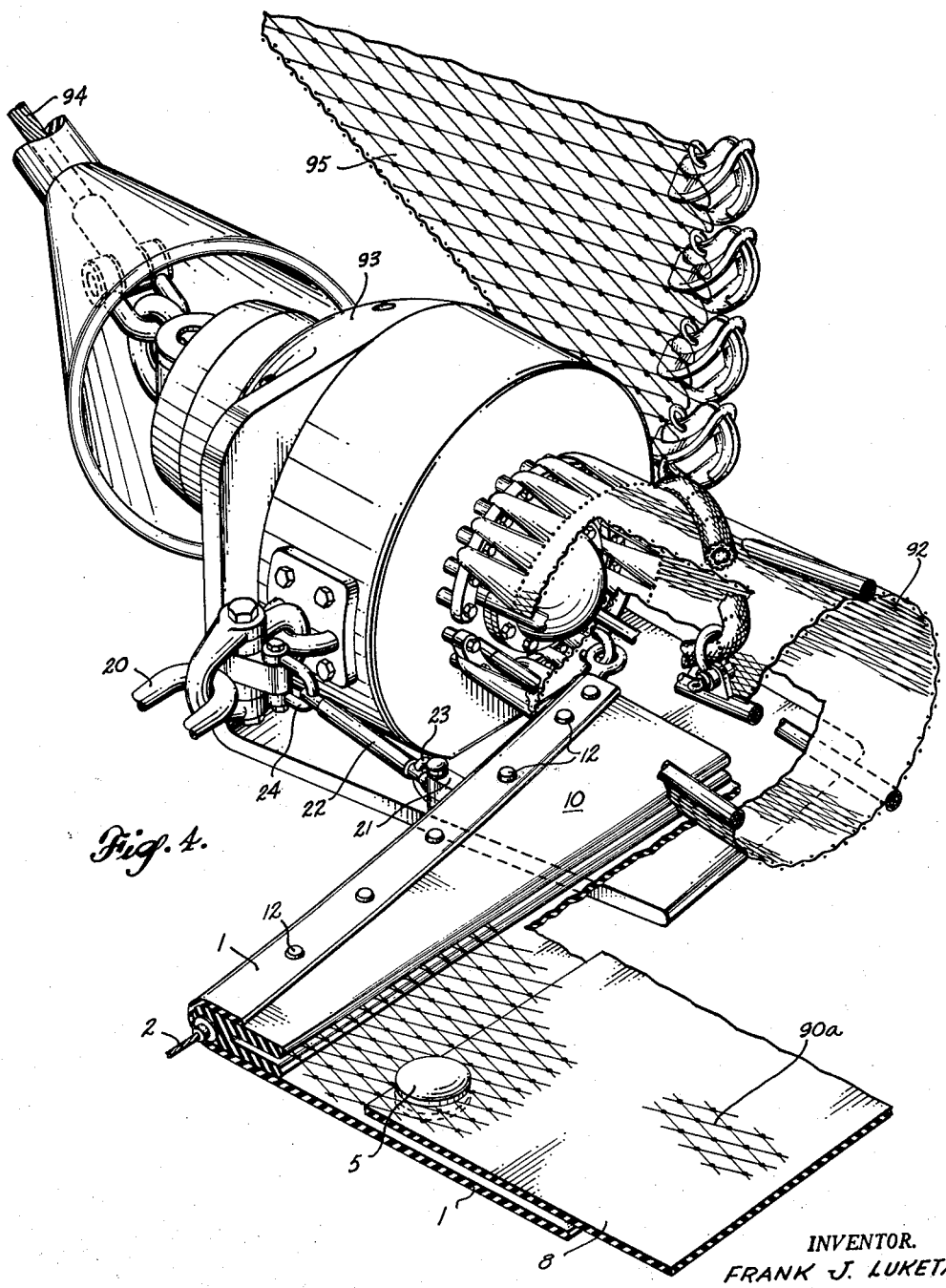

June 9, 1964 F. J. LUKETA 3,136,085
SUSPENSION FOR TRAWL NET PANELS AND CHAFING GEAR
Filed March 12, 1962 4 Sheets-Sheet 3
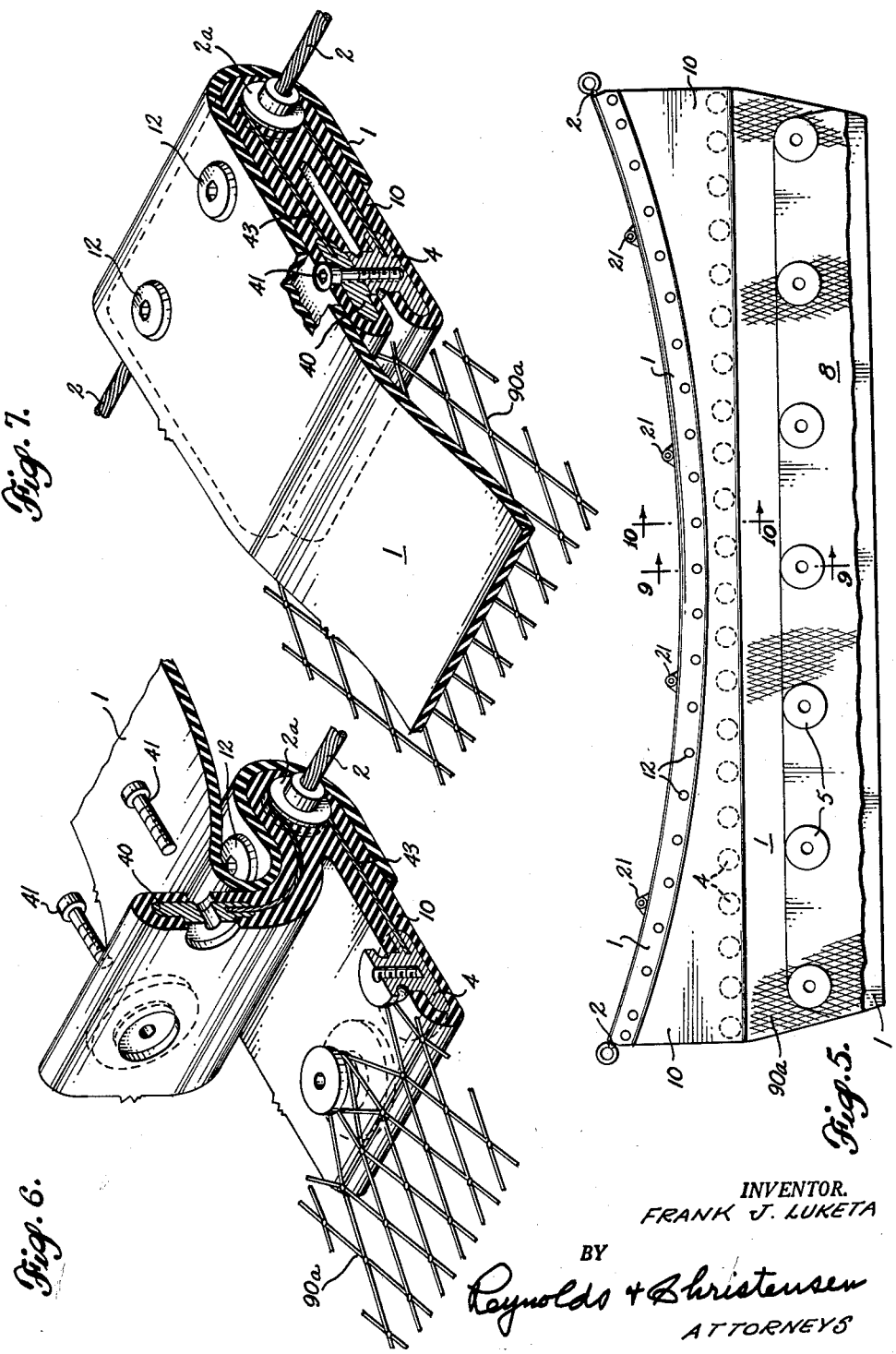
INVENTOR.
FRANK J. LUKETA
BY
Reynolds & Christensen
ATTORNEYS June 9, 1964  F. J. LUKETA  3,136,085
SUSPENSION FOR TRAWL NET PANELS AND CHAFING GEAR
Filed March 12, 1962  4 Sheets-Sheet 4
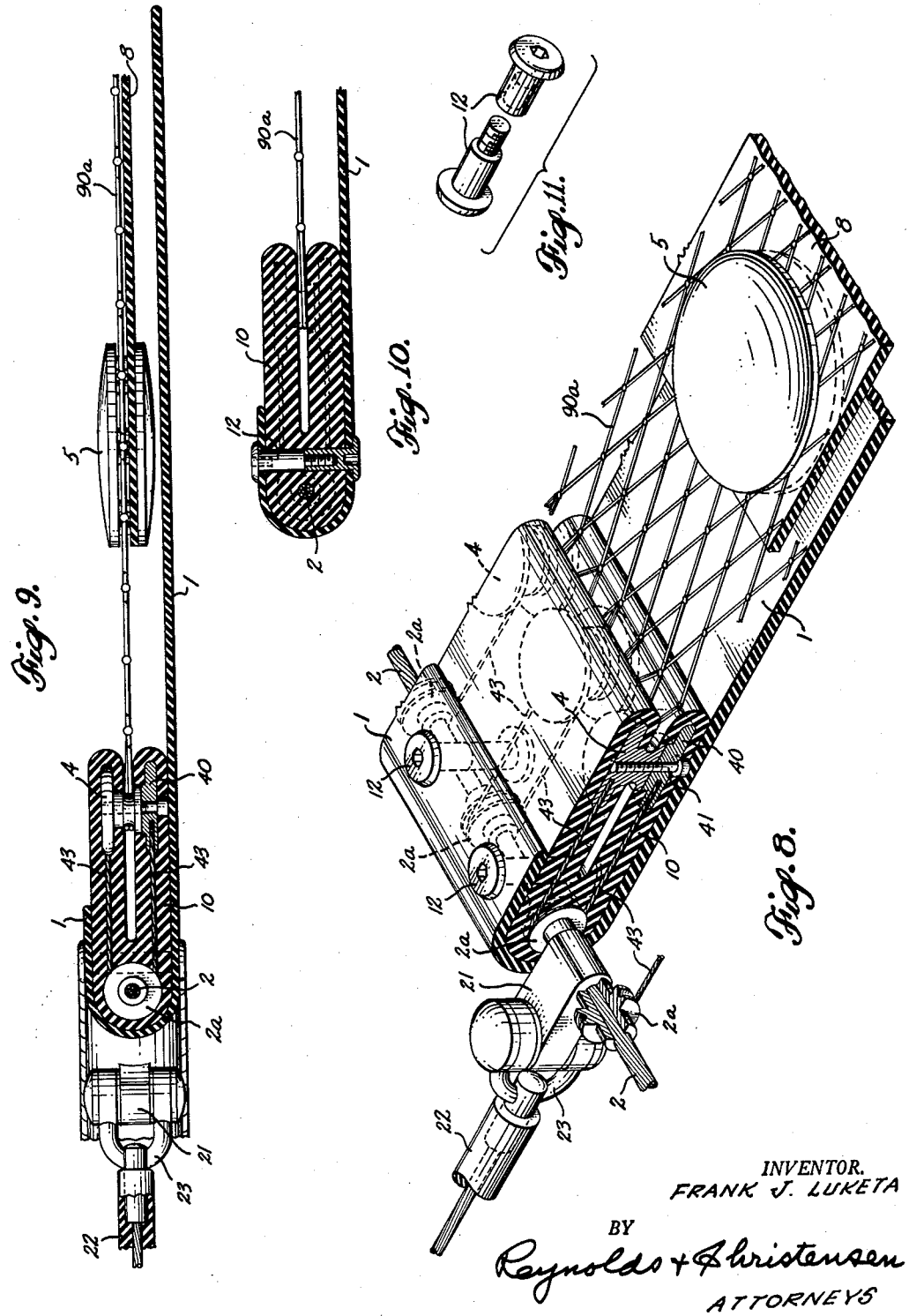
INVENTOR.
FRANK J. LUKETA
BY
Reynolds + Christensen
ATTORNEYS

United States Patent Office 3,136,085
Patented June 9, 1964

3,136,085
SUSPENSION FOR TRAWL NET PANELS
AND CHAFING GEAR
Frank J. Luketa, 5567 Greenwood Ave., Seattle 3, Wash.
Filed Mar. 12, 1962, Ser. No. 178,902
25 Claims. (Cl. 43—9)

The present invention primarily relates to suspension apparatus for trawl nets, and more particularly to a bosom forming apron for joining the transverse forward edge of a trawl net body panel to sweep line means extending forwardly of the net body and assuming the drag thereof. The invention also relates to chafing gear for the apron, the forward portion of said net body panel, and the forward portion of a protective mat interposed between the bottom of the net body and the ocean floor, such chafing gear being employed in conjunction with the apron in bottom trawl net installations, wherein the apron forms the lower bosom of the bottom trawl net, and it and the lower body panel of the trawl net are dragged along the bottom.

Generally speaking, the mesh of the panels forming the funnel portions of trawl nets are point-cut along the transversely extending forward edge of such panels and, according to the preferred practice, the net is dragged forwardly by sweep lines attached to the respective forward corners of such panels. If the sweep lines were to be attached directly to or even beyond the forward corners of such net panel, the sweep lines would drag the forward edge of the panel into a transverse curve or bow, and this would distort the meshes of said panel. Also, in bottom trawl net installations, wherein the sweep lines extend forwardly of the lower panel of the funnel, the body panel must be prevented from coming in contact with the ocean floor by means of chafing gear, such as a sheet or mat of wear-resistant rubber or like material, for example. To some extent these protective mats resist distortion in their general plane, but in other respects they are somewhat flexible. Also, these protective mats must be connected along their forward edges to the net in the vicinity of its lower bosom. The tendency to bow the mesh panel along a line located in the general plane of the protective mat, wherein said protective mat is stiff, would only be partially resisted by the protective mat, but such mat would be wrinkled by forces acting on it transversely to its general plane. These wrinkles would then tend to snag on the ocean floor as the net is dragged forwardly thereon. In addition, the point-cut forward edge of the body panel, and the meshes of such panel, would be distorted, and the stresses in the net panel would tend to be concentrated at the leading corners of such panel, which is not a desirable result.

According to the present invention the point-cut forward edge of the lower mesh panel is maintained straight throughout its length, by suspending it from the transversely straight rear edge of a protective apron. The forward edge of such apron is normally bowed as viewed in plan and incorporates a similarly bowed bosom line. The leading protective mat forming the chafing gear for the lower panels of the net body is suspended primarily from the mesh panel, but in such manner that the protective mat is kept flat, and does not wrinkle, and so that its leading edge and metal suspending buttons associated with the protective mat are protected by an apron cover sheet or a like element from the possibility of contact with the bottom, and so nothing can snag nor wear, other than the apron cover sheet primarily. By these provisions all parts of the net in this region are protected from excessive concentrations of stress, from distortion, and from injury by contact with the ocean floor.

In addition to the objects indicated above, it is an object of this invention to provide specific forms of apron, securing means for the same and for the chafing gear, and of the attachment of the apron to the bosom, especially when the bosom is supported by bobbin rollers above the bottom.

These and other objects will appear more fully as this specification progresses.

In the accompanying drawings the invention is shown in a preferred form.

FIGURE 1 is a plan view of a net, broken away in part, and incorporating the present invention.

FIGURE 2 is a side elevational view, also broken away, showing the same net.

FIGURE 3 is an enlarged cross-sectional view at the line 3—3 of FIGURE 1.

FIGURE 4 is an isometric view to a larger scale, and broken away, showing the structure in the vicinity of a forward end of a suspender and the junction between a curtain and the funnel or body of the net.

FIGURE 5 is a plan view, looking downwardly, of the apron and its connections to the net body and to the bosom line.

FIGURE 6 is an isometric view of the same parts, in underside view, illustrating a step in the assembly of these parts, and FIGURE 7 is a like view, showing the assembly completed.

FIGURE 8 is an isometric view of the same parts and of associated parts, but from the top, showing the complete assembly.

FIGURE 9 is a longitudinal vertical sectional view of the complete assembly, at a line such as 9—9 of FIGURE 5.

FIGURE 10 is a similar view, at a line such as 10—10 of FIGURE 5.

FIGURE 11 is an isometric view of one of the screw fasteners that secures the protective apron cover.

The general form of trawl net with which this invention is connected includes a codend 9, open at its forward end and closed during use at its after end. A funnel 90 of mesh opens divergently forwardly from a rigid expander ring 91, to which the forward end of the codend is connected. Suspenders 92 of heavy mesh, and in effect part of the funnel, extend from a connector 93 at each side, at the forward terminus of the funnel, aft to the expander ring 91 and distribute the pull of sweep lines 94, also anchored to the connectors 93, evenly to the circumference of the open forward end of the codend without materially stressing the lightly meshed other netting that together with the suspenders composes the funnel 90. Curtains 95, suspended from curtain lines 96, are joined at their respective rear edges to the side edges of the overhang 90b. The curtain lines 96 are in effect upper sweep lines, and they and the lower sweep lines 94 extend forwardly to anchorages at opposite doors (not shown), the function of which is to spread the curtains apart at their forward ends. The opposite curtain lines 96 are joined across the upper bosom of the net by a float line 96a.

The codend 9 and the funnel 90 drag over the bottom, and would be subject to wear, and to snagging, were they not protected by chafing gear. The particular form of chafing gear employed includes several sheets or mats of tough, wear-resistant material, rubber for example, indicated at 8 (FIG. 4, for example), interposed between the mesh of the funnel 90 and codend 9 and the ocean floor over which they are dragged. This chafing gear must be supported from the netting and from the lines that transfer drag from the sweep lines to the netting, in such manner that the drag is evenly distributed, and no part of the netting is unduly stressed, nor the chafing gear sheets distorted.

The lower bosom of the net is defined by a line joining the after ends of the lower sweep lines 94. This lower bosom line may be considered to be a cable or line 2, called a bosom line to distinguish it from line 20 which is only fragmentarily shown, but which is part of a bobbin line that supports and permits rotation of bobbins 3, which bobbins 3 in turn support the lower bosom in a slightly elevated position above the bottom. Both such lines 2 and 20 extend between the rear termini of lower sweep lines 94, being anchored to the respective connectors 93; see in particular FIGURE 4.

According to this invention I provide a bosom forming member or apron 10 of wear-resistant material, such as rubber composition, and preferably formed as a molding. Its forward edge is curved to correspond to the bow or curvature of the bosom line 2 (and that of the bobbin line 20), and the bosom line 2 is incorporated within this curved forward edge of the apron 10. The rear edge of the apron 10 is straight, transversely of the net, and the complemental straight, point-cut forward edge of the lower funnel panel 90a is connected thereto at frequent intervals. The apron's expendable protective cover sheet 1 extending beneath the points of connection at 5 of the chafing gear to the mesh, protects such points of connection, and prevents snagging. It also underlies the forward edge of chafing gear sheets 8.

The manner of effecting the assembly of the apron 10 with the bosom line 2 and the bobbin line 20, of the apron with the mesh, and of the chafing gear with the mesh, are specifically parts of this invention. Since the bosom line 2 would tend to sag downwardly between its ends and be subject to snagging, were it to be supported only at its ends, arrangements are made to connect it at intervals in its length to the bobbin line 20. Clips 21 are secured at intervals in the length of bosom line 2, corresponding to intervals between bobbins 3, and lines 22 join clevises 23 attached to clips 21, and similar anchorages 24 on the bobbin line 20, intermediate the bobbins 3; see FIGURES 4, 5, 8 and 9. The apron's concave forward edge embeds the bosom line 2, and extends aft therefrom. To the rear of the line 2 the upper and lower parts of this rubber molding which constitutes the apron are split or separate, and separable because of the flexibility of the material. Two-part anchorages 4, 40 are embedded at frequent intervals in the separate rear-edge portions of the apron 10, behind bosom line 2 along a straight line, and are held together during use by screws 41. Forward edge points of the mesh 90a fit about the anchorage elements 4, between the upper and lower parts of the split apron 10, and are retained by securement together of the upper and lower parts by the screws 41; compare FIGURES 6 and 7. The anchorage elements 4, 40 are joined to the rear of the embedded bosom cable 2, by load-bearing cables 43, which relieves the apron 10 of the stress of pulling the mesh, and transfers the pull from bosom line 2 to the mesh quite directly. The cables 43 may be swaged onto the line elements 2a. The expendable protective apron cover 1 underlies the apron 10, wraps about its forward edge, and is secured by the screw fasteners 12. Were it not that this apron cover 1 assumes much of the wear, and must be replaced rather frequently, it could be made integral with the apron 10. Functionally it is a part of the apron, and will at times be referred to hereinafter as an extension of the apron, for it extends rearwardly thereof. It could also be considered a forward extension of the chafing gear sheets 8, but again, while these must be replaced at times, it is unlikely that they will require replacement as often as the cover sheet 1. It is, therefore, most economical to make the apron 10, the chafing gear sheets 8, and the cover sheet 1 each as a separate element, even though there is a functional relation between the apron 10 and the sheet 1 as a rearward extension of the latter, and between the sheet 1 and chafing gear sheet 8, as a forward extension of the latter.

The chafing gear sheet or mat 8 is connected directly to the mesh 90a. This enables readily changing a chafing gear sheet if the need arises. The connection can be by means of a series of chafing gear buttons 5, of upper and lower parts formed as in my Patent No. 3,018,580, dated January 30, 1962, and suitably clamped together to include between them a mesh square and the chafing gear sheet 8. These buttons are distributed in a straight line across the forward edge of the chafing gear sheet 8, and the apron cover 1 underlies and protects them and the forward edge of the sheet 8.

The straight point-cut leading edge of the mesh held in even straight-line suspension as the result of this invention, whereby all trailing banks of meshes are then also in transverse alignment, greatly simplifies and facilitates the correct placement of the chafing gear buttons 5 in a straight line, which in turn assures that the chafing gear sheets 8 and the several other chafing gear sheets, under the funnel, which are mounted in the same manner, will be suspended with equal stress on each attachment button and supporting mesh square, and with no concentration of stress at any one attachment.

By using this invention all parts of the body as well as the codend of the trawl net, especially of the net illustrated, could be fully, economically and conveniently protected from bottom chafing, and by using bobbins of sufficient size very rocky bottoms, unfishable now, could be efficiently fished.

While the forward edge of apron cover 1 has been described as curved or bowed, it might be straight, and the length of the respective load-bearing lines 22 could be varied to connect with such straight forward edge of the apron, from the bosom line 2. Also, while the invention is particularly applicable to a funnel the forward edge of the lower panel whereof is point-cut, another style of cut may equally well be suspended without concentration of stress, by appropriate modification of the details described.

Each of the elements 12, and 4, 40, 41, and 5, is in effect a post or fastening means. Since, however, each must be removed at times, to permit replacement of the element which it secures in place—the cover sheet 5, the mesh 90a, and the chafing gear sheets 8, respectively—each is conveniently formed as a two-part screw element that is readily separable. In function, however, each is a post.

I claim as my invention:

1. In combination, a trawl net body panel of mesh construction having a transverse forward edge; a bosom forming apron extending transversely across said forward edge and having a concave forward edge; means connecting the apron to said net body panel; and line means connected to each end of the apron and extending forwardly therefrom to a trawler for dragging the net forwardly.

2. The combination of claim 1, such combination further including a bosom line connected at its ends to said line means for dragging the net forwardly, said bosom line being curved in correspondence with the concave forward edge of the apron and being joined to said apron.

3. In combination, a trawl net body panel of mesh construction having a transverse forward edge; a bosom forming apron extending transversely across said forward edge of the body panel; a bosom line extending through the apron; means connecting the apron to said body panel; drag line means connected to each end of the bosom line for dragging the apron and net forwardly in the water; a bobbin assembly disposed between said drag line means forwardly of the apron; means connecting each end of the bobbin assembly with the drag line means adjacent thereto; and tension means interconnecting the bobbin assembly at intervals to said bosom line.

4. The combination of claim 1, said means connecting the apron to said net body panel comprising a plurality of releasable anchorage means distributed in a straight line across said apron, such anchorage means joining the forward edge of the net to the apron.

5. In combination, a trawl net body panel of mesh construction having a transverse forward edge; a bosom forming apron extending transversely across said forward edge of the body panel, said apron having a concave forward edge; means connecting the apron to said net body panel; a protective mat secured at its forward edge to the net body panel adjacent its forward edge and extending across and below the body panel as chafing gear; a rearward extension of said apron underlying the forward edge of said chafing gear protective mat; and line means connected to each end of the apron and extending forwardly thereof to a trawler for dragging the net forwardly in the water.

6. In combination, a trawl net body panel of mesh material, point-cut from side to side along a generally straight forward edge; a substantially inelastic apron concavely curved along its forward edge and extending transversely from end to end of the generally straight forward edge of the apron; anchorage means distributed at intervals in a straight line across said apron, to the rear of its curved forward edge, and releasably engaged with the point-cut forward edge of the mesh, and line means connected to the ends of the curved forward edge of the apron and extending forwardly therefrom to a trawler and used for dragging the net body forwardly in the water.

7. The combination of claim 6, further comprising a protective cover sheet for the apron, said cover sheet extending below the apron and rearwardly therefrom below a portion of the net body panel, said protective cover sheet constituting chafing gear for the apron and said portion of the net body panel.

8. The combination of claim 6, said combination further including a protective mat extending along the bottom of the net body panel as chafing gear; means connecting said protective mat to the net body panel; and cover means extending both below and rearwardly of the apron, such cover means overlapping the forward edge of the protective mat.

9. In combination, a trawl net body panel of mesh construction, point-cut from side to side along a generally straight line at its forward edge; a substantially inelastic apron concavely curved along its forward edge and extending transversely from end to end of the straight forward edge of the panel; anchorage means distributed at intervals in a straight line across said apron, to the rear of its curved forward edge, and releasably engageable with the point-cut forward edge of the body panel; drag line means connected to the ends of the curved forward edge of the apron and extending forwardly thereof to a trawler, said drag line means being used for dragging the net body forwardly in the water; a bosom line joined to the forward edge of the apron, and at its ends to the drag line means; and load-bearing cables encircling said bosom line and engaging each anchorage means, said load-bearing cables transmitting stress during dragging between the net body panel and the dragging means through the apron.

10. In combination, a net body panel of mesh material having a straight transverse forward edge; a bosom forming member extending transversely across and ahead of said forward edge of the body panel, said member having a concavely curved forward edge and an upper and lower flap along its rear edge; a plurality of complemental and paired anchorage elements disposed at intervals lengthwise of the bosom forming member, between its upper and lower flaps, and interengageable to anchor the forward edge of the body panel entered between said flaps; and line means connected to each end of the bosom forming member and extending forwardly thereof to a fishing vessel, said line means being used for towing the net in the water.

11. The combination of claim 10, said combination further including a cover sheet for the bosom forming member, said cover sheet being supported at the forward edge of the bosom forming member and extending rearwardly beneath said bosom forming member and the forward portion of the body panel.

12. The combination of claim 10, said combination further including a bosom line embedded within the curved forward edge of the bosom forming member, and load bearing cables encircling said bosom line at intervals and engaging at least some of the paired anchorage elements.

13. The combination of claim 12, said combination further including posts extending through said bosom forming member to the rear of said bosom line; and a rearwardly extending cover sheet encircling the front edge of the bosom forming member and secured to such member by the post, said cover sheet extending below both the bosom forming member and the netting to the rear of the same.

14. In combination with a net body of mesh having a straight transverse forward edge, two suspenders constituting part of the net body, arranged to assume the major portion of the drag of the net body, and terminating adjacent the respective ends of such straight forward edge, a connector to which each suspender is anchored, means extending forwardly from each suspender for dragging the net forwardly, a line joining the connectors at the opposite sides, a flexible but substantially inelastic apron curved concavely along its forward edge between said connectors, and joined to said line, and means joining said apron, along a straight line to the rear of its curved forward edge, to the straight forward edge of the mesh.

15. The combination of claim 14, including a bobbin line extending transversely ahead of the apron, and anchored at its ends to the respective connectors, tension means interconnecting said bobbin line and said first-mentioned line at intervals in their length, and bobbins revoluble about said bobbin line.

16. In combination, a net body panel of mesh material having a forward edge; an apron having a rear edge substantially conforming to the net panel's forward edge, said apron being curved along its forward edge to define a bosom; means interconnecting the forward edge of said net body panel to the apron, said means being constructed to distribute the dragging stress substantially evenly across the net panel's forward edge to the several meshes thereof; and line means connected to the ends of the apron and extending forwardly thereof to a fishing vessel, said line means functioning to drag the net forwardly in the water.

17. In combination, a net body panel of mesh material having a forward edge; an apron having a rear edge substantially conforming to the net panel's forward edge, and joined thereto, said apron being curved along its forward edge to define a bosom; means joined to the opposite ends of the apron to drag the net forwardly; a protective cover curved at its forward edge conformably with and secured to the apron, and trailing rearwardly beneath the apron and the forward edge of the body panel, and with the juncture of the apron with the forward edge of the mesh being arranged to distribute the dragging stress substantially evenly across the net panel's forward edge to the several meshes thereof.

18. The combination of claim 17, said combination further including a chafing gear protective mat suspended along its transverse forward edge from and beneath the body panel, rearwardly of the juncture between the body panel and the apron, and the protective cover extending rearwardly beneath the forward edge of the chafing gear protective mat.

19. A trawl net including a net panel terminating in a transverse forward edge, an apron of wear-resistant material disposed ahead of said net panel, and shaped at its forward edge to define a bosom of the net, means at the ends of said apron for anchorage of sweep lines which extend forwardly for dragging the net, and means for interconnecting the apron and panel, with a portion of said apron underlining and protecting said interconnecting means from contact with the bottom.

20. A trawl net including a net panel terminating in a transverse forward edge, an apron of wear-resistant material disposed ahead of said net panel, and shaped at its forward edge to define a bosom of the net, means at the ends of said apron for anchorage of sweep lines which extend forwardly for dragging the net, means for interconnecting the apron and panel, with a portion of said apron underlining and protecting said interconnection means from contact with the bottom, said apron having a slit between its upper and lower surfaces for the reception of the forward edge of the net panel, the interconnecting means extending between those portions of the apron that are divided by the slit, and a protective sheet secured at its forward edge to said apron, and extending beneath and rearwardly of said slit in the apron and said interconnecting means, to protect the latter.

21. In combination, in a trawl net, a line extending across and defining a bosom of such net; a wear-resistant member encircling said line, and extending aft thereof, said member having a rearwardly opening slit along its after edge; means to anchor the meshes of a portion of the net within said slit; means connected to the respective ends of said line for dragging the same forwardly, whereby when such wear-resistant member is dragged by said line the net is in turn dragged by said member.

22. A trawl net including a panel terminating in a forward edge, an apron of wear-resistant material disposed ahead of said net panel, and shaped at its forward edge to define a bosom of the net, means at the ends of said apron for anchorage of line means which extend forwardly for dragging the net, and means interconnecting the apron and panel.

23. In combination with a net body of mesh terminating at a transverse forward edge adjacent the net's lower bosom, a substantially inelastic apron having a rear edge complemental to and directed transversely beneath said transverse forward edge of the net body, and joined thereto, said apron being bowed along its forward edge to define the lower bosom, and means joined to the opposite ends of said apron for dragging the apron and the joined net forwardly, the stress of said dragging means being distributed by said apron generally evenly across the forward edge of the net.

24. In a bottom trawl net such as includes a funnel of mesh, a bosom line extending across the lower bosom of the funnel, a wear resistant bosom forming member encircling the bosom line, an extension thereof directed aft and slit inwardly along its after edge, and means to anchor the meshes of the lower bosom within such slit.

25. The combination of claim 24, the anchoring means including a stud half embedded in the extension above and below the slit, at the inner side thereof and at each mesh anchorage location, and means to secure together said stud halves after engagement of a mesh therewith.

References Cited in the file of this patent

UNITED STATES PATENTS

| | | |
|---|---|---|
| 2,536,251 | Baloun | Jan. 2, 1951 |
| 2,783,573 | Rau | Mar. 5, 1957 |
| 2,816,386 | Harris et al. | Dec. 17, 1957 |
| 3,018,580 | Luketa | Jan. 30, 1962 |
| 3,023,529 | Luketa | Mar. 6, 1962 |

FOREIGN PATENTS

| | | |
|---|---|---|
| 85,580 | Denmark | May 19, 1958 |
| 425,993 | France | Apr. 21, 1911 |
| 312,805 | Great Britain | June 6, 1929 |
| 727,652 | Great Britain | Apr. 6, 1955 |